United States Patent [19]
Koros

[11] 4,212,835
[45] Jul. 15, 1980

[54] METHOD AND APPARATUS FOR INTRODUCING A QUENCH STREAM IN UPFLOW GAS-LIQUID CONTACTORS

[75] Inventor: Robert M. Koros, Westfield, N.J.

[73] Assignee: Exxon Research & Engineering Co., Florham Park, N.J.

[21] Appl. No.: 140,747

[22] Filed: May 6, 1971

[51] Int. Cl.² .............................................. B01F 3/04
[52] U.S. Cl. .................................... 261/116; 202/158; 261/114 A; 261/118
[58] Field of Search .............................. 261/19, 21–22, 261/76, 78 A, 108–111, 114 A, 116, 118, 122–124, 126; 23/283, 285, 288 E; 202/158; 423/DIG. 13

[56] References Cited
U.S. PATENT DOCUMENTS

| | | | |
|---|---|---|---|
| 1,651,354 | 12/1927 | Alexander | 261/114 A |
| 1,806,089 | 5/1931 | Seguy | 261/114 A X |
| 2,147,786 | 2/1939 | Fenske et al. | 261/114 A |
| 2,398,953 | 4/1946 | O'Brien | 261/114 A |
| 2,856,171 | 10/1958 | Otto | 261/111 |
| 2,862,698 | 12/1958 | Howerton et al. | 261/114 A |
| 3,287,001 | 11/1966 | Harris | 261/78 A |
| 3,407,179 | 10/1968 | Carr | 23/285 X |

FOREIGN PATENT DOCUMENTS

| | | | |
|---|---|---|---|
| 37593 | 6/1900 | Fed. Rep. of Germany | 261/108 |
| 586674 | 10/1933 | Fed. Rep. of Germany | 261/118 |

*Primary Examiner*—Richard L. Chiesa
*Attorney, Agent, or Firm*—H. N. Wells; F. Donald Paris

[57] ABSTRACT

A mixing device for combining a quench or catalyst stream with the main fluid stream in an upflow gas-liquid contactor, such as a reactor. A gas-liquid stream is passed through a reduced size passage wherein the quench or catalyst streams are injected. The combined stream then is mixed and redistributed.

3 Claims, 4 Drawing Figures

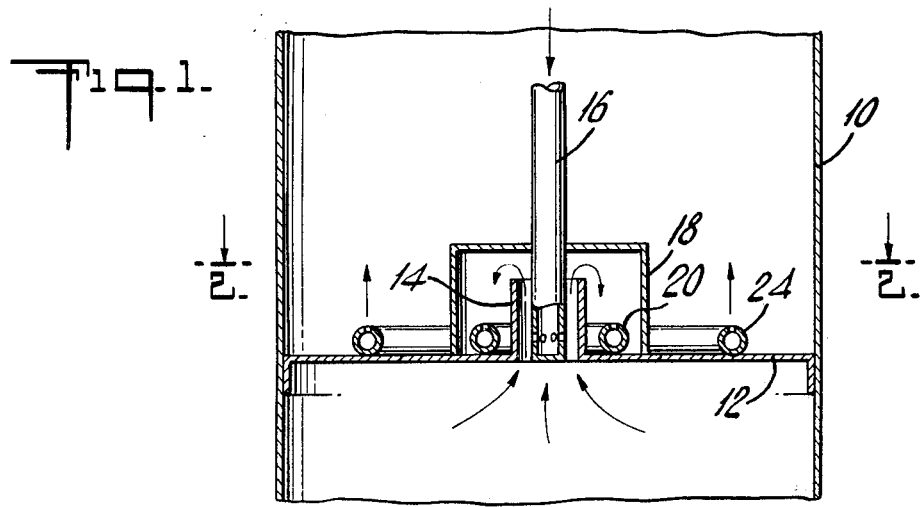
Fig. 1.
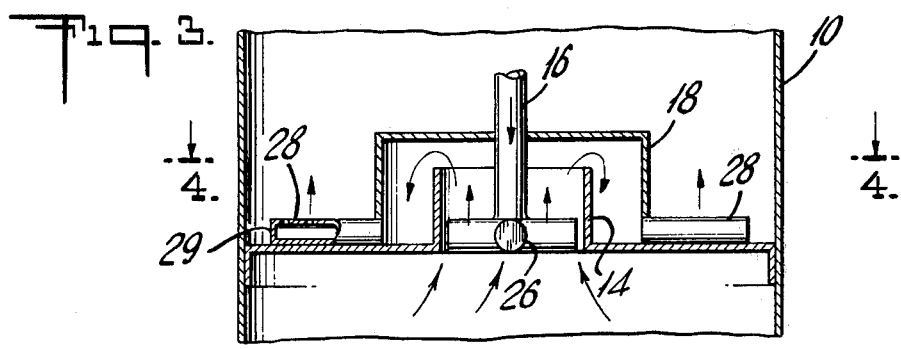
Fig. 3.
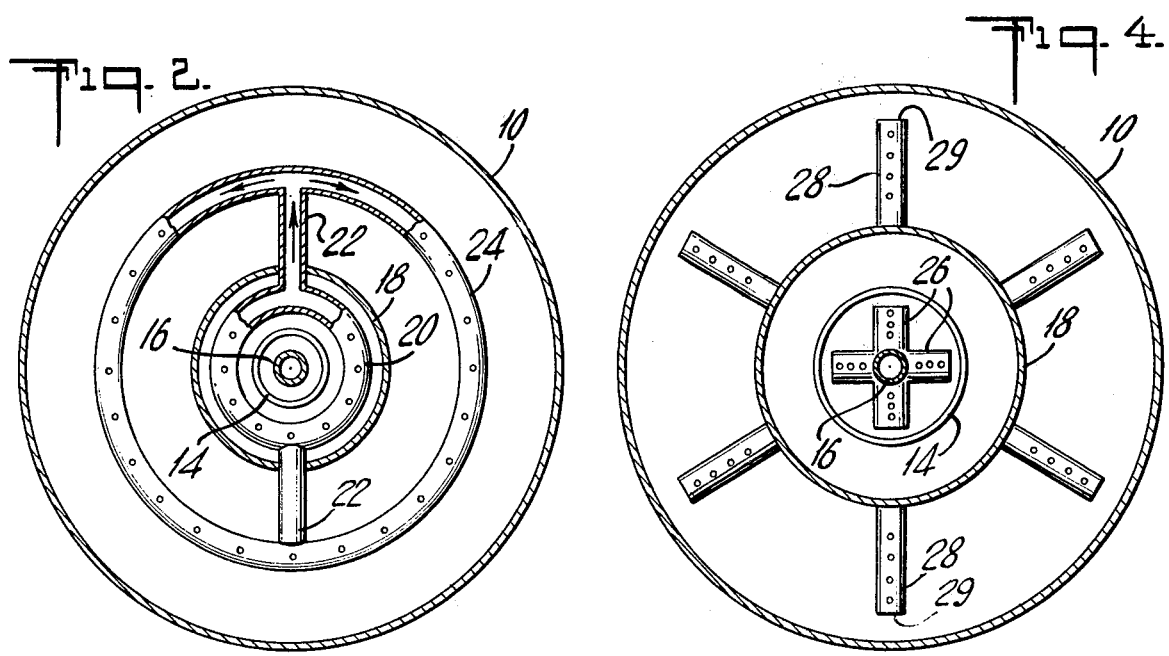
Fig. 2.
Fig. 4.

METHOD AND APPARATUS FOR INTRODUCING A QUENCH STREAM IN UPFLOW GAS-LIQUID CONTACTORS

BACKGROUND OF THE INVENTION

There are many industrially important operations in which it is necessary to introduce a quench stream, a catalyst stream or some other secondary stream into a primary stream which is being passed through a contacting device or reactor. Typical of some of these commercially important operations are hydrofining of oils, hydrocracking of heavy hydrocarbons into lighter compounds, synthesis of ammonia and oxonation of olefins to aldehydes. In such operations, it is very often necessary to add the secondary streams to obtain certain benefits, e.g., introducing a quench stream to remove reaction heat and thereby control reactor temperature, adding catalyst to replace that which has already been consumed and thereby controlling the progress of a chemical reaction, adding a reactant to replace that which has been consumed, or providing an excess needed to obtain the maximum yield from a chemical reaction.

In reactions where the primary stream is a mixture of liquid and gas, as exemplified by hydrofining, hydrocracking and oxonation reactions, it is particularly difficult to assure good mixing of the secondary streams with the primary stream. This is due to the fact that gases and liquid tend to separate unless they are traveling at such speeds that they are inherently mixed. However, in commercial reactors where a relatively long residence time is required, the fow rates are such that the separation of gas and liquid is quite significant especially in upfow reactors. In such instances the chemical reaction is not as uniform as it would be with good mixing of gas and liquid. The introduction of quench or other secondary streams becomes much more difficult and the design of mixing facilities becomes critical to the overall performance of the reactor itself.

The prior art shows a number of ways in which such secondary streams may be introduced. They may include any or a combination of the following typical mixing devices. Slotted plates may be used to obtain mixing by entrainment on the downstream side of the slots and by sparging the secondary stream into the jet created by the slots in the plates. A similar operation may be performed using perforated trays, bubble type cap trays or such similar devices as are used in fractionating towers. Beds packed with Raschig rings, Berl saddles or other commercially available packing materials may be used in order to break up the large bubbles of gas which may tend to be formed in the liquid and also to improve the contacting of the gas and liquid with the secondary streams. Special spargers may be used to distribute the secondary stream uniformly across the reactor. Any number of devices have been suggested in the prior art, substantially all of which have proven quite unsatisfactory.

The present invention presents a novel combination of mechanical elements which make possible extremely good mixing of the three phases, i.e., the liquid and gas of the primary stream and the secondary stream. This invention is especially useful where performance of prior art devices indicates that temperature or reaction control are less than satisfactory and optimum performance of the reaction system has not been achieved. The present invention provides exceptionally effective mixing and makes possible the control of reactions which have heretofore been marginally operable when using prior art devices.

SUMMARY OF THE INVENTION

According to the present invention, the entire cross-section of the reactor or contactor is blocked by a plate or internal head having a restricted passageway located preferably, but not necessarily, in the center. The primary stream, a liquid and gas mixture traveling in an upwardly direction, is forced to flow through the restricted passageway. A sparger placed in the center of the passageway introduces the secondary stream into the primary stream. Following this, the mixed stream is prevented from phase separation by being passed through a sharp turn (generally 90° to 180°), reversing on itself and traveling momentarily in a downward direction. The mixed stream then enters one of a number of possible distributors and is distributed uniformly about the cross-sectional area of the reactor above the plate previously mentioned. The effect of the combination of mechanical elements which is used herein is to force all reacting or contacting mixtures into a confined space from which they are then released and redistributed. The gas and liquid portions are forced to come together at a point at which the secondary stream may be introduced. This obtains an extremely effective mixing of the three phases which assures the benefits which are intended by the introduction of the secondary stream. A more detailed description of preferred embodiments may be obtained from the description below and with reference to the drawings.

BRIEF DESCRIPTION OF THE DRAWINGS

FIG. 1 shows a side view of one embodiment of the present invention illustrating the flow of reactant fluids through a device constructed in accordance with the teachings of the present invention.

FIG. 2 is a cross-sectional view of the device of FIG. 1 taken substantially along line 2—2 of FIG. 1 showing the disposition of the inner and outer distributor rings and the connection therebetween.

FIG. 3 is a side view of a second embodiment of the present invention.

FIG. 4 is a cross-sectional view taken substantially along the line 4—4 of FIG. 3.

DESCRIPTION OF THE PREFERRED EMBODIMENTS

The drawings illustrate two possible configurations which incorporate the principles of the present invention, namely, forcing the gas and liquid primary stream flowing upwardly in a reactor through a restricted passageway wherein the primary stream is contacted by a quench, catalyst, or some other secondary stream. The combined streams make a sharp turn and are forced into a distributor which redistributes the well-mixed fluids.

FIG. 1 shows ring-type distributors. A portion of the contactor or reactor wall 10 is shown. Such a reactor may have one or more contacting beds (not shown) above and below the redistributor and quench device which is illustrated. The gas-liquid mixture (shown by the upwardly directed arrows) is forced by centrally apertured plate 12 to enter the narrow channel formed by the chimney 14 extending upward from plate 12. The chimney 14 is preferably located centrally, but may be off center, if necessary. As the gas-liquid mixture is passed at relatively high velocity through the chimney 14, the quench or other secondary stream is injected through the quench pipe 16 as shown by the downwardly directed arrows. This particular design is intended to be used where the secondary stream is relatively small compared to the primary stream and adequate distribution may be obtained simply by perforating the end of the quench pipe 16 inside the chimney 14. The combined streams then pass upwardly until they are stopped by the closed end of the cap 18 which is disposed over the chimney 14. Thus, the streams are caused to make a sharp turn shown here but not necessarily limited to 180°. The change of direction would generally be between 90° and 180°, but other angles could be used if they prevent phase separation from occurring. The streams pass downwardly until they reach the toroidal inner distributor ring 20 located between the chimney 14 and the cap 18. The ring is uniformly perforated to receive an assist in mixing and redistributing the streams. The inner distributor ring 20 receives the streams and passes them by means of connecting pipes 22 (see FIG. 2) passing through the closed cap 18 to a toroidal outer distributor ring 24 concentric to inner ring 20. Outer ring 24 also is perforated and distributes the mixed streams evenly over the reactor cross-section. The redistribution of the stream inherently also provides mixing of the fluids above the redistributor. It is to be understood that the number of rings and the perforations therein used is dependent on the flow rates of the stream. The openings are sized in such a way as to evenly distribute the fluids and creates uniform gas bubbles without exceeding the allowable pressure drop across the mixing system. The number of holes shown here are for illustration only and will vary depending on the flow rates in the particular application in which the device is used.

FIG. 2 illustrates a cross-sectional view of the same mixing device shown in FIG. 1, particularly making clear the location of the connecting pipes 22 suitably connected at one end to the inner distributor ring 20 and which passes through the walls of the cap 18 and suitably connects the inner distributor ring 20 with the outer distributor ring 24. It would of course be possible to eliminate the inner distributor ring 20 and provide multiple passageways corresponding to connecting pipes 22 to intersect the outer ring 24.

FIG. 3 illustrates a second embodiment of the present invention which would be useful for systems where the quantity of the quench or other secondary stream is somewhat larger relative to the primary stream and thus requires a larger quench pipe distributor. In this configuration, the primary stream, gas and liquid flowing together, are forced through a chimney 14 in the plate 12. The quench or secondary stream is dispersed in the primary stream by entering through quench pipe 16 and exiting through the quench distributor 26 located within chimney 14. The quench distributor 26, shown here with four radial arms extending from quench pipe 16, is provided because the larger flow cannot be dispersed through holes in the quench pipe 16 itself. As before, the mixed streams flow upwardly until they are stopped by the closed end of the cap 18 whereupon they make a sharp turn passing downwardly into an annular chamber formed between the chimney 14 and the cap 18. The streams then pass radially outward through the spaced radial distributor arms 28 disposed about the circumference of the cap 18 and are distributed through holes therein.

FIG. 4 illustrates a cross-sectional view of the mixing device of FIG. 3, illustrating more clearly the quench distributor 26 which is provided at the end of quench pipe 16 and the connection of the multiple arms 28 which distribute the fluid in a radial direction. These radial arms 28 are perforated in the direction in which the fluid will normally flow and are closed at the ends 29 in order to force the fluids out through the perforations in the pipe 28. It will be understood that the number of radial arms shown herein is for illustrative purposes only and may vary depending on the flow rates for the particular system with which the disclosed device is to be used.

The previous description of two preferred embodiments of the present invention is primarily for illustrative purposes, it being recognized that a number of variations might be used which would still incorporate the essence of the invention. Accordingly, reference should be made to the following claims in determining the true scope of the invention.

What is claimed is:

1. A method of contacting a quench or other secondary fluid stream with a mixed phase primary fluid stream in an up-flow contactor which comprises:
   (a) flowing said mixed phase primary fluid stream upward through a constricted passageway;
   (b) combining said secondary stream with said primary fluid stream within said constricted passageway; so that the combined primary and secondary streams flow cocurrently upward;
   (c) flowing said combined primary and secondary fluid streams upward and thereafter;
   (d) changing the flow direction of said combined primary and secondary streams to prevent separation of the phases; and
   (e) redistributing said combined streams cocurrently and uniformly across said contactor in an upward direction.

2. A mixing device for up-flow gas-liquid contactors wherein a quench or other secondary stream is contacted with a mixed phase primary fluid stream comprising:
   (a) a passageway through which all of said mixed phase primary stream is passed in an upward direction, said passageway having a smaller cross-section than that of said contactor;
   (b) means for introducing said quench or other secondary stream into said passageway for combining said quench or other secondary stream with said upward flowing mixed phase primary stream whereby the combined streams flow cocurrently upward, said means for introducing quench or other secondary stream into said passageway comprising a sparger pipe having openings located to evenly distribute said quench or other secondary stream;
   (c) continuation passageway means operably disposed relative to said passageway for causing the combined streams to change flow direction thereby preventing separation of the phases; and
   (d) means for extracting said streams from said continuation passageway means and redistributing said mixed phase streams cocurrently and uniformly across said contactor in an upward direction.

3. A mixing device for up-flow gas-liquid contactors wherein a quench or other secondary stream is contacted with a mixed phase primary fluid stream comprising:

(a) a passageway through which all of said mixed phase primary stream is passed in an upward direction, said passageway having a smaller cross-section than that of said contactor;

(b) means for introducing said quench or other secondary stream into said passageway for combining said quench or other secondary stream with said upward flowing mixed phase primary stream whereby the combined streams flow cocurrently upward;

(c) continuation passageway means operably disposed relative to said passageway for causing the combined streams to change flow direction thereby preventing separation of the phases; and (d) means for extracting said streams from said continuation passageway means and redistributing said mixed phase streams cocurrently and uniformly across said contactor in an upward direction, said means for extracting and redistributing said streams comprising a first toroidal ring positioned within said continuation passageway means and communicating with a second toroidal ring positioned outside said continuation passageway means and concentrically disposed at the central axis of said contactor, said inner and outer rings having openings evenly distributed about said rings on the uppermost circumference.

* * * * *